US012137366B2

(12) United States Patent
Peranandam et al.

(10) Patent No.: US 12,137,366 B2
(45) Date of Patent: Nov. 5, 2024

(54) ELECTRONICS AND DATA RESOURCE SHARING MARKETPLACE PLATFORM

(71) Applicant: GM Global Technology Operations LLC, Detroit, MI (US)

(72) Inventors: Prakash M. Peranandam, Rochester Hills, MI (US); Arun Adiththan, Sterling Heights, MI (US); Ramesh Sethu, Troy, MI (US); Paolo Giusto, Brentwood, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 390 days.

(21) Appl. No.: 17/727,238

(22) Filed: Apr. 22, 2022

(65) Prior Publication Data
US 2023/0345287 A1    Oct. 26, 2023

(51) Int. Cl.
*G06Q 30/00* (2023.01)
*G07C 5/00* (2006.01)
*H04W 28/02* (2009.01)
*H04W 28/18* (2009.01)

(52) U.S. Cl.
CPC ........ *H04W 28/0215* (2013.01); *G07C 5/008* (2013.01); *H04W 28/0226* (2013.01); *H04W 28/18* (2013.01)

(58) Field of Classification Search
CPC ................................................ G06Q 30/06–08
See application file for complete search history.

(56) References Cited

U.S. PATENT DOCUMENTS

| 6,851,115 | B1* | 2/2005 | Cheyer | G06F 9/465 717/114 |
|---|---|---|---|---|
| 2011/0225276 | A1* | 9/2011 | Hamilton, II et al. | G06F 9/5027 709/231 |
| 2016/0070758 | A1* | 3/2016 | Thomson | G16H 10/60 707/781 |
| 2021/0082210 | A1* | 3/2021 | Sakr | G07C 5/008 |

OTHER PUBLICATIONS

Li, Yunpeng et al., "Optimal Pricing for Peer-to-Peer Sharing with Network Externalities", IEEE-ACM Transactions on Networking 29.1: 148-161, Feb. 2021 (Year: 2021).*

* cited by examiner

*Primary Examiner* — Ethan D Civan
(74) *Attorney, Agent, or Firm* — Vivacqua Crane, PLLC

(57) ABSTRACT

A resource sharing marketplace platform includes a back-office server including a controller adapted to run a plurality of integrated systems and a wireless communication module in communication with the controller, wherein, the resource sharing marketplace platform is adapted to receive a request from a user, collect data from a plurality of acceptable service providers, and provide a response to the user.

20 Claims, 2 Drawing Sheets

ELECTRONICS AND DATA RESOURCE SHARING MARKETPLACE PLATFORM

INTRODUCTION

The present disclosure relates to a multi-vehicle resource sharing marketplace platform for dynamic, distributed, decentralized services.

Modern vehicles are equipped with many sensors of different types that capture real-time data of conditions within and surrounding a vehicle, such as road and weather conditions. In addition, such vehicles are equipped with computer systems to provide computing power for running various systems within the vehicle. These sensors and computer systems are capable of collecting data and performing data processing that greatly exceeds the needs of the vehicle. Furthermore, such sensors and computer systems are often underutilized or idle. During operation of the vehicle, sensors and computer system capability are not always needed at full capacity, so the remaining capacity can be offered to the other users, and the data that is collected for its own operations could be required and beneficial for others, and when the vehicle is not being used, and is parked, such sensors and computer systems are not used at all and can be put to use when conditions are satisfied.

Consumers use many information/data resources that are remote to the consumer and accessed via wireless data transfer systems. Many information/data resources house databases of information that may be accessed by such consumers. Unfortunately, such databases are only reliable if they are kept up to date. For example, a mapping application that a consumer accesses via wireless communication between his/her vehicle or his/her hand-held device provides information on roadways that is gathered by the owner of the mapping application. Such information is not gathered continuously or in real time, thus, the accuracy of the data is limited to when the mapping database was most recently updated. Further, fluid conditions, such as construction or vehicle accidents may not be included in such information.

Thus, while current information/data resources achieve their intended purpose, there is a need for a new and improved system and method for providing multi-vehicle resource sharing for dynamic, distributed, decentralized services, that allows real-time data to be collected from other vehicle's sensors and computer systems in response to a request for such data from a user, thus, providing the user real-time information. Further, there is a need to provide a platform for such resource sharing that allows potential service providers to opt-in and agree to allow access to their vehicle's onboard sensors and computer systems for a fee.

SUMMARY

According to several aspects, of the present disclosure, a resource sharing marketplace platform includes a back-office server including a controller adapted to run a plurality of integrated systems, wherein, the resource sharing marketplace is adapted to receive a request from a user, collect data from a plurality of acceptable service providers, and provide a response to the user.

According to another aspect, the back-office server further includes a wireless communication module in communication with the controller.

According to another aspect, the resource sharing marketplace platform is further adapted to authenticate identification of the user and facilitate the user log-in to the resource sharing marketplace platform.

According to another aspect, the resource sharing marketplace platform is further adapted to establish dynamic parameters related to the request from the user, break down the request from the user into a plurality of micro-queries, and develop a contract including key clauses and reward constraints.

According to another aspect, the resource sharing marketplace platform is further adapted to send a request for data to a plurality of potential service providers.

According to another aspect, the resource sharing marketplace platform is further adapted to negotiate the contract between the resource sharing marketplace platform and the plurality of potential service providers, and to select the plurality of acceptable service providers.

According to another aspect, the resource sharing marketplace platform is adapted to one of negotiate the contract with each of the plurality of potential service providers individually, and negotiate the contract with the plurality of potential service providers collaboratively.

According to another aspect, the resource sharing marketplace platform is further adapted to verify quality of data collected from the plurality of acceptable service providers, and establish data delivery procedures.

According to another aspect, the resource sharing marketplace platform is further adapted to distribute negotiated rewards to the plurality of acceptable service providers.

According to several aspects of the present disclosure, a resource sharing marketplace platform includes a back-office server including a controller adapted to run a plurality of integrated systems and a wireless communication module in communication with the controller, wherein, the resource sharing marketplace platform is adapted to receive a request from a user, collect data from a plurality of acceptable service providers, and provide a response to the user.

According to another aspect, the plurality of integrated systems includes a gateway system adapted to authenticate user identification, facilitate the user's log in to the resource sharing marketplace platform, and receive the request from the user.

According to another aspect, the plurality of integrated systems includes a query builder adapted to establish dynamic parameters related to the request from the user.

According to another aspect, the plurality of integrated systems includes a query analyzer adapted to break down the request from the user into a plurality of micro-queries.

According to another aspect, the plurality of integrated systems includes a contract builder adapted to develop a contract including key clauses and reward constraints.

According to another aspect, the plurality of integrated systems includes a messaging broker adapted to send a request for data to a plurality of potential service providers.

According to another aspect, the plurality of integrated systems includes a solving engine adapted to negotiate the contract between the resource sharing marketplace platform and the plurality of potential service providers, and to select the plurality of acceptable service providers.

According to another aspect, the solving engine is adapted to one of negotiate the contract with each of the plurality of potential service providers individually, and negotiate the contract with the plurality of potential service providers collaboratively.

According to another aspect, the plurality of integrated systems includes a service execution system adapted to collect data from the acceptable service providers, verify quality of data collected from the plurality of acceptable service providers, and establish data delivery procedures.

According to another aspect, the plurality of integrated systems includes a reward distribution system adapted to distribute negotiated rewards to the plurality of acceptable service providers.

According to several aspects of the present disclosure, a method of providing shared resources with a resource sharing marketplace platform includes authenticating, with a gateway system, via a wireless communication module in communication with a controller within a back-office server, identification of a user, and facilitating the user's log-in to the resource sharing marketplace platform, receiving, with the gateway system, a request from the user, establishing dynamic parameters related to the request from the user with a query builder system, breaking down the request from the user into a plurality of micro-queries with a query analyzer, developing a contract including key clauses and reward constraints with a contract builder, sending a request for data to a plurality of potential service providers with a messaging broker, negotiating the contract between the resource sharing marketplace platform and the plurality of potential service providers, and selecting a plurality of acceptable service providers with a solving engine, collecting data from the acceptable service providers, verifying quality of data collected from the plurality of acceptable service providers, establishing data delivery procedures, and providing a response to the user with a service execution system, and distributing negotiated rewards to the plurality of acceptable service providers with a reward distribution system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
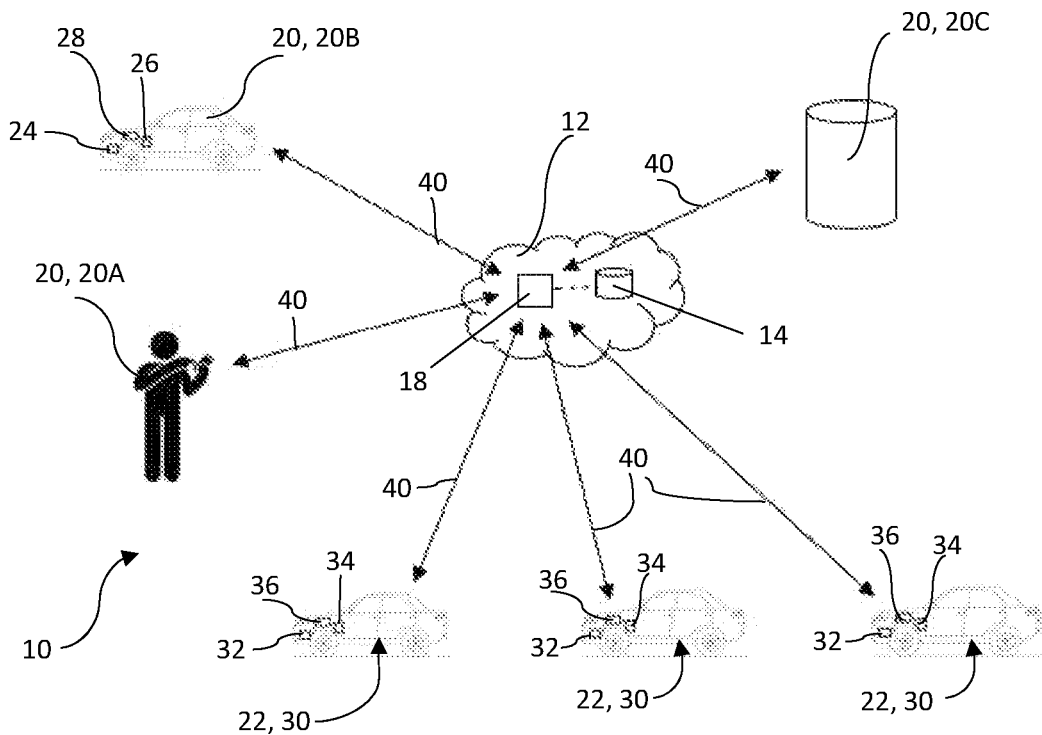
FIG. 1 is a schematic diagram of a multi-vehicle resource sharing marketplace platform according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a resource sharing marketplace platform 10 in accordance with an exemplary embodiment of the present disclosure includes a back-office server 12 including a controller 14 adapted to run a plurality of integrated systems 16 and a wireless communication module 18 in communication with the controller 14. The back-office server 12 supports all aspects of the resource sharing marketplace platform 10, and may be cloud based.

The controller 14 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
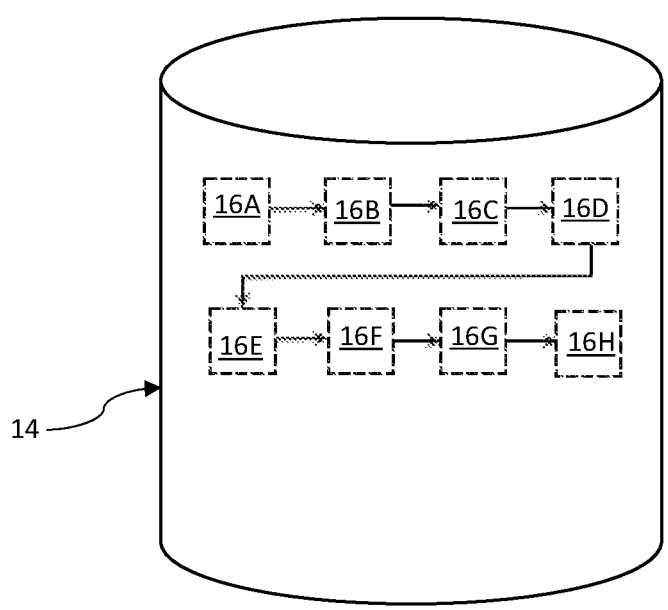
FIG. 2 is schematic view of a controller of the platform shown in FIG. 1.

Referring to FIG. 2, the plurality of integrated systems 16 are located within the controller 14 of the resource sharing marketplace platform 10. The plurality of integrated systems 16 includes programs, algorithms, and processes, that perform discreet functions and together provide the functionality of the resource sharing marketplace platform 10. In an exemplary embodiment, the controller 14 includes a gateway system 16A, a query builder 16B, a query analyzer 16C, a contract builder 16D, a message broker 16E, a solving engine 16F, a service execution system 16G, and a reward distribution system 16H.

The resource sharing marketplace platform 10 is adapted to receive a request from a user 20, collect data from a plurality of acceptable service providers 22, and provide a response to the user 20. For example, one such request from a user 20 may be to find out what the weather and road conditions are like at a destination that the user 20 is headed toward. The user can be an individual or set of users or an institute. The user 20 accesses the resource sharing marketplace platform 10 via an application on a personal hand-held device or a computer, as shown at 20A, or, via an application within the user's vehicle, as shown at 20B. Further, the user 20 may be an institutional user 20C, such as a mapping application provider, which wants to use the resource sharing marketplace platform 10 to obtain updated information for its' own databases.

The back-office server 12 includes a wireless communication module 18 in communication with the controller 14 that is adapted to allow wireless communication between the back-office server 12, users 20 of the resource sharing marketplace platform 10, potential service providers, acceptable service providers 22 and other vehicles or other external sources, as indicated by arrows 40. Wireless communication, with the wireless communication module 18, is enabled via a wireless data communication network over wireless communication channels such as a WLAN, 4G/LTE or 5G network, or the like.

When a user 20 accesses the resource sharing marketplace platform 10, the gateway system 16A is adapted to authenticate the user's 20 identification, facilitate the user's 20 log in to the resource sharing marketplace platform 10, and receive the request from the user 20. If the user 20 is new to the resource sharing marketplace platform 10, the gateway system 16A will allow the user 20 to create an account and register to use the platform 10. A user 20 vehicle includes onboard systems 24, sensors 26, and a wireless communication module 28.

After a request is received, the query builder 16B is adapted to establish dynamic parameters related to the request from the user 20. Optionally, the user can be allowed to build the query using the dynamic parameters and the allowed value ranges. Functions of the query builder 16B include defining loosely coupled parameters and value definitions, selecting dynamic sub-parameters based on identified parameters and values, highlighting logic-based primary and optional parameters, and establishing the query architecture template and logic.

The query analyzer 16C is adapted to break down the request from the user 20 into a plurality of micro-queries. The query is decomposed into multiple micro-queries. For example, referring to the user 20 request above for weather and road conditions at a destination, the original query, "weather conditions" is broken down into multiple, micro-queries for more specific information, such as rain, temperature, humidity, fog, atmospheric pressure, etc. Likewise, the original query, "road conditions" is broken down into multiple, micro-queries for more specific information, such as lane markings, traffic congestion, road quality, construction activity, traffic signals, etc. The query decomposition logic is based on the data/service type, re-use of existing data, and previous or multiple requests of similar nature for multi objective optimization. Each query/micro query is treated as an independent service request within the system and the independent service data results shall then be combined by the back-office to deliver it to the user 20. The result data collation step itself can be an independent service request.

The contract builder 16D is adapted to develop a contract including policies, standards, key clauses and reward constraints. The contract builder 16D uses key parameters from the query to create a contract between potential service providers 30, the users 20 and owner of the resource sharing marketplace platform 10. The contract includes terms that define what service is being asked for, and what reward restraints apply. The reward restraints define the fee that a potential service provider 30 can expect for providing the requested services. In the example above, the user 20 has asked for weather conditions and road conditions at a destination. The contract builder 16D may be an artificial intelligence powered contract generator that includes terms in the contract that describe the services being requested. For instance, the contract may call for a potential service provider 30 to authorize access to sensors within the potential service provider's vehicle to determine current weather conditions. Likewise, the contract builder 16D will include relevant key contract clauses, such as, but not limited to, governing law, confidential information, security & privacy information, data breach notice, cooperation with regulators, and platform provider policies.

After the query has been validated and processed, and the contract has been created, the messaging broker 16E is adapted to send a request for services to a plurality of potential service providers 30. The services that may be requested may range from simply accessing the onboard sensors 32 on a potential service provider's 30 vehicle, to more substantial requests that may require the potential service provider 30 to take a specific action, such as stopping at a specific location for a period of time, or altering their intended route.

A potential service provider 30 is any individual who has previously expressed a willingness to participate by signing up and providing contact information to the platform 10. The vehicles of each potential service provider 30 must include onboard sensors 32, systems 34 and a wireless communication module 36 to allow contact and communication between the potential service provider 30 and the resource sharing marketplace platform 10. The service can be synchronous (online) or asynchronous (offline) mode. In the offline mode the system 34 has the capacity to interpret the query and appropriately collect the data and send it. In the online mode the system 34 provides the platform 10 with the real-time access to the available sensors and accessories and the back-office process decides how and what data to be collected. Thus, the resource sharing marketplace platform 10 has a pool of potential service providers 30.

Potential service providers 30 may provide instructions on what type of services they are willing to provide, and how authorization may occur. For instance, a potential service provider 30 may indicate that all service requests must be specifically authorized, or that certain service requests are automatically authorized. For example, a potential service provider 30 may indicate that any request to access vehicle sensors 32 that will be transparent to the potential service provider 30 is automatically authorized. Thus, if such a potential service provider 30 is sent a request for weather information, and the platform 10 needs to access sensors within the potential service provider's vehicle that measure temperature and humidity, the platform 10 will automatically access the vehicle sensors 32 to gather the data. In such instance, the service provider, or the owner/operator of the vehicle, is unaware that the platform 10 is accessing the vehicle sensors 32.

The message broker 16E is adapted to send requests for services to selected potential service providers 30 based on the nature of the services being requested and the appropriateness of an individual potential service provider 30 to provide such services. For example, if the user 20 has requested information on the weather conditions at a particular destination, the message broker 16E will select potential service providers 30 that are at or near the destination. Information about current weather conditions at a destination would only be relevant from potential service providers 30 that are currently at or very near that destination. Similarly, if the user 20 has requested information on the road conditions at a particular destination, the message broker 16E will select potential service providers 30 that are at or near the destination, or have recently been at or near the destination. Information about road conditions are not as time dependent, thus, the onboard systems 34 within the vehicle of a potential service provider 30 that passed through the area of the subject destination within the last twenty-four hours, for example, would have relevant information about the road conditions at the destination.

In an exemplary embodiment, the message broker 16E ranks potential service providers 30 based on current location and relevance of data that can be provided to further narrow the list of potential service providers 30 to which requests are sent. The message broker 16E may further apply query based region filtering, sending the request to potential service providers within single or multiple states, cities or neighborhoods, as well as region specific service provider filters based on the capabilities and workload characteristics of the potential service provider 30 vehicle.

Finally, the message broker 16E will provide with the request, a proposed reward or fee structure for the services. Fees may be based on the nature of the services. For example, transparent services, that require no overt action on the part of the potential service provider 30 would offer a smaller fee than services that require a potential service provider 30 to alter their route, or stop at a specific location for a length of time. The potential service provider 30 may accept the request at the given terms, may reject the request, or may attempt to negotiate a better fee, as discussed further below.

Once requests have been sent out to a selected plurality of potential service providers 30, the solving engine 16F is adapted to negotiate the contract between the resource sharing marketplace platform 10 and the plurality of potential service providers 30, and to select a plurality of acceptable service providers 22 from the plurality of selected potential service providers 30.

In an exemplary embodiment, the solving engine 16F is adapted with multi objective optimization to either negotiate the contract with each of the plurality of potential service providers 30 individually, or negotiate the contract with the plurality of potential service providers 30 collaboratively. The fee/rewards negotiations may also depend on if a service is requested by one or more users as part of the multi objective optimization process. The solving engine 16F will negotiate collaboratively with a group of selected potential service providers 30 that are similarly situated, and likely to provide similarly relevant data. If, however, the selected potential service providers 30 differ, and are capable of providing varying data types and relevance, the solving engine 16F will negotiate individually with the selected potential service providers 30. The solving engine 16F can be intervened by authorized humans associated with the platform.

At this time, the selected potential service providers 30 have the opportunity to negotiate the offered fee. The application for the resource sharing marketplace platform 10 allows the selected potential service providers 30 to respond by acceptance, rejection, or counter-offer. If an individual potential service provider 30 feels the service warrants a larger fee, they can request it. The contract negotiations with the potential service providers 30 are based on the type of service, the area where the service is being requested, number of times data is to be collected from the potential service provider 30, if the service is transparent or requires overt action on the part of the potential service provider 30, and the number of similar requests and the fees accepted/received for them. Once the solving engine 16F has identified a sufficient number of potential service providers 30 willing to accept the negotiated fee, the solving engine 16F selects the plurality of acceptable service providers 22 from the plurality of selected potential service providers 30.

Once acceptable service providers 22 have been selected and contracts between the acceptable service providers 22 and the resource sharing marketplace platform 10 are in place, the service execution system 16G is adapted to collect data from the acceptable service providers 22, verify quality of the data collected from the plurality of acceptable service providers 22, and establish data delivery procedures for providing a response to the user 20. The resource sharing marketplace platform 10 collects data from the plurality of acceptable service providers 22 via an application programming interface. Appropriate sensors 32 and systems 34 within each vehicle of the acceptable service providers 22 are initialized according to time and location based requests. If necessary, reminders are sent to the driver of the vehicle for overt actions that must be taken, such as re-routing the vehicle, driving at a specified speed, or stopping at a particular location for a length of time.

After data has been collected successfully from the acceptable service providers 22, the reward distribution system 16H is adapted to distribute negotiated rewards to the plurality of acceptable service providers 22. Fee/rewards payment and receipt is pre-arranged between the resource sharing marketplace platform 10, registered users 20 and potential service providers 30 ahead of time using known digital payment applications.

The system 10 of the present disclosure allows a user 20 to access real time data from multiple other individuals. This gives the user 20 more updated and accurate information. The user 20 pays a nominal calculated fee for such services, which is appropriately disbursed among the service providers 22 and the platform 10 owner. This allows a service provider 22 to generate a revenue stream in exchange for continued access to the sensors 32 and systems 34 within the service provider's vehicle. This is a win-win arrangement that allows individuals to share vehicle sensor and system resources that benefits both the user 20 and the service provider 22.

Figure 3:
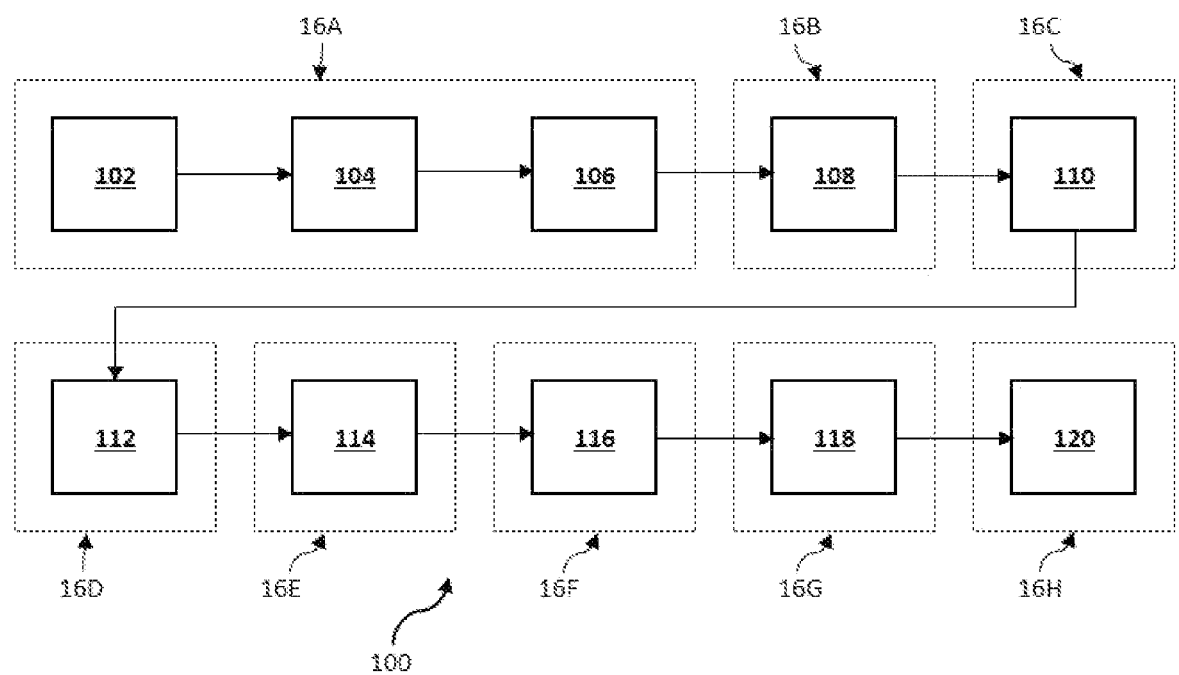
FIG. 3 is a schematic flow chart illustrating a method according to an exemplary embodiment.

Referring to FIG. 3, a method of providing shared resources with a resource sharing marketplace platform is shown schematically at 100. The corresponding systems 16 for performing the steps of the method 100 are shown in shadow. Beginning at block 102, the method includes authenticating, with the gateway system 16A, via the wireless communication module 18 in communication with the controller 14 within the back-office server 12, the identification of a user 20, and, moving to block 104, facilitating the user's log-in to the resource sharing marketplace platform 10.

Moving to block 106, the method 100 further includes receiving, with the gateway system 16A, a request from the user 20, and moving to block 106, establishing, with a query builder 16B, dynamic parameters related to the request from the user 20. Moving to block 110, the method 100 includes breaking down the request from the user 20 into a plurality of micro-queries with the query analyzer 16C, and, moving to block 112, developing a contract including key clauses and reward constraints with the contract builder 16D.

Moving to block 114, the method 100 includes sending a request for data to a plurality of potential service providers 30 with the messaging broker 16E, and moving to block 116, negotiating the contract between the resource sharing marketplace platform 10 and the plurality of potential service providers 30, and selecting a plurality of acceptable service providers 22 with the solving engine 16F.

Moving to block 118, the method 100 includes collecting data from the acceptable service providers 22, verifying quality of the data collected from the plurality of acceptable service providers 22, establishing data delivery procedures, and providing a response to the user 20 with the service execution system 16G, and finally, moving to block 120, the method 100 includes distributing negotiated rewards to the plurality of acceptable service providers 22 with the reward distribution system 16H.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A resource sharing marketplace platform, comprising:
a back-office server including a controller adapted to run a plurality of integrated systems;
wherein, the resource sharing marketplace is adapted to:
receive a request from a user for access to and collection of data from at least one vehicle sensor located within a vehicle of at least one acceptable service provider;
select at least one acceptable service provider from a pool of potential service providers that have previously engaged with and are willing to participate with the resource sharing marketplace based on the nature of the data being requested and the appropriateness of an individual one of the pool of potential service providers to provide such data, wherein the appropriateness of an individual one of the pool of potential service providers is based on the data that is being collected by sensors within a vehicle of the individual one of the pool of potential service providers and the location of the vehicle of the individual one of the pool of potential service providers at the time the request is received;
send a request to the selected at least one acceptable service provider requesting permission to access and collect data from at least one vehicle sensor located within a vehicle belonging to the at least one acceptable service provider;
collect data from the at least one acceptable service provider via an application programming interface by at least one of:
automatically accessing and collecting real-time data from sensors within the at least one acceptable service provider vehicle when the at least one acceptable service provider has previously authorized automatic authorization to such sensors and data; and
accessing and collecting real-time data from sensors within the at least one acceptable service provider vehicle when the at least one acceptable service provider authorizes such access and data collection in response to the request from the resource sharing marketplace; and
provide a response to the user using a service execution system, the response based on data collected from the at least one selected acceptable service provider that has sensors adapted to collect data that is appropriately related to the request and was collected when the at least one selected acceptable service provider was at an appropriate location to collect such data.

2. The resource sharing marketplace platform of claim 1, wherein the back-office server further includes a wireless communication module in communication with the controller.

3. The resource sharing marketplace platform of claim 2, wherein the resource sharing marketplace platform is further adapted to authenticate identification of the user and facilitate the user log-in to the resource sharing marketplace platform.

4. The resource sharing marketplace platform of claim 3, wherein the resource sharing marketplace platform includes a query builder adapted to establish dynamic parameters related to the request from the user, a query analyzer adapted to break down the request from the user into a plurality of micro-queries, and a contract builder adapted to develop a contract including key clauses and reward constraints.

5. The resource sharing marketplace platform of claim 4, wherein the resource sharing marketplace platform is further adapted to send a request for data to the at least one potential service provider with a messaging broker adapted to rank potential service providers and apply region filtering to narrow the pool of potential service providers to which requests are sent.

6. The resource sharing marketplace platform of claim 5, wherein the resource sharing marketplace platform is further adapted to negotiate the contract between the resource sharing marketplace platform and the at least one potential service provider, and to select the at least one acceptable service provider.

7. The resource sharing marketplace platform of claim 6, wherein the resource sharing marketplace platform is adapted to one of:
negotiate the contract with each of the at least one potential service provider individually; and
negotiate the contract with the at least one potential service provider collaboratively.

8. The resource sharing marketplace platform of claim 6, wherein the service execution system of the resource sharing marketplace platform is further adapted to verify quality of data collected from the at least one acceptable service provider, and establish data delivery procedures for providing the response to the user, and send reminders to the selected at least one acceptable service provider for overt actions that must be taken by the selected at least one acceptable service provider related to the request.

9. The resource sharing marketplace platform of claim 8, wherein the resource sharing marketplace platform includes a reward distribution system that is adapted to distribute negotiated rewards to the selected at least one acceptable service provider.

10. A resource sharing marketplace platform, comprising:
a back-office server including a controller adapted to run a plurality of integrated systems and a wireless communication module in communication with the controller;
wherein, the resource sharing marketplace platform is adapted to:
receive a request from a user for access to and collection of data from at least one vehicle sensor located within a vehicle of at least one acceptable service provider;
select at least one acceptable service provider from a pool of potential service providers that have previously engaged with and are willing to participate with the resource sharing marketplace based on the nature of the data being requested and the appropriateness of an individual one of the pool of potential service providers to provide such data, wherein the appropriateness of an individual one of the pool of potential service providers is based on the data that is being collected by sensors within a vehicle of the individual one of the pool of potential service providers and the location of the vehicle of the individual one of the pool of potential service providers at the time the request is received;

send a request to the selected at least one acceptable service provider requesting permission to access and collect data from at least one vehicle sensor located within a vehicle belonging to the at least one acceptable service provider;

collect data from at least one acceptable service provider via an application programming interface by at least one of:
  automatically accessing and collecting real-time data from sensors within the at least one acceptable service provider vehicle when the at least one acceptable service provider has previously authorized automatic authorization to such sensors and data; and
  accessing and collecting real-time data from sensors within the at least one acceptable service provider vehicle when the at least one acceptable service provider authorizes such access and data collection in response to the request from the resource sharing marketplace; and provide a response to the user using a service execution system, the response based on data collected from the at least one selected acceptable service provider that has sensors adapted to collect data that is appropriately related to the request and was collected when the at least one selected acceptable service provider was at an appropriate location to collect such data.

11. The resource sharing marketplace platform of claim 10, wherein the plurality of integrated systems includes a gateway system adapted to authenticate user identification, facilitate the user's log in to the resource sharing marketplace platform, and receive the request from the user.

12. The resource sharing marketplace platform of claim 11, wherein the plurality of integrated systems includes a query builder adapted to establish dynamic parameters related to the request from the user.

13. The resource sharing marketplace platform of claim 12, wherein the plurality of integrated systems includes a query analyzer adapted to break down the request from the user into a plurality of micro-queries.

14. The resource sharing marketplace platform of claim 13, wherein the plurality of integrated systems includes a contract builder adapted to develop a contract including key clauses and reward constraints.

15. The resource sharing marketplace platform of claim 14, wherein the plurality of integrated systems includes a messaging broker adapted to send a request for data to the at least one potential service provider wherein the messaging broker is adapted to rank the pool of potential service providers and apply region filtering to narrow the pool of potential service providers to which requests are sent.

16. The resource sharing marketplace platform of claim 15, wherein the plurality of integrated systems includes a solving engine adapted to negotiate a contract between the resource sharing marketplace platform and the at least one potential service provider, and to select the at least one acceptable service provider.

17. The resource sharing marketplace platform of claim 16, wherein the solving engine is adapted to one of:
  negotiate the contract with each of the at least one selected potential service provider individually; and
  negotiate the contract with the at least one selected potential service provider collaboratively.

18. The resource sharing marketplace platform of claim 17, wherein the plurality of integrated systems includes a service execution system adapted to collect data from the at least one selected acceptable service provider, verify quality of data collected from the at least one selected acceptable service provider, and establish data delivery procedures.

19. The resource sharing marketplace platform of claim 18, wherein the plurality of integrated systems includes a reward distribution system adapted to distribute negotiated rewards to the at least one selected acceptable service provider.

20. A method of providing shared resources with a resource sharing marketplace platform, comprising:
  authenticating, with a gateway system, via a wireless communication module in communication with a controller within a back-office server, identification of a user, and facilitating the user's log-in to the resource sharing marketplace platform;
  receiving, with the gateway system, a request from the user for access to and collection of data from at least one vehicle sensor located within a vehicle of at least one acceptable service provider;
  establishing dynamic parameters related to the request from the user with a query builder system;
  breaking down the request from the user into a plurality of micro-queries with a query analyzer;
  developing a contract including key clauses and reward constraints with a contract builder;
  selecting at least one acceptable service provider from a pool of potential service providers that have previously engaged with and are willing to participate with the resource sharing marketplace based on the nature of the data being requested and the appropriateness of an individual one of the pool of potential service providers to provide such data, wherein the appropriateness of an individual one of the pool of potential service providers is based on the data that is being collected by sensors within a vehicle of the individual one of the pool of potential service providers and the location of the vehicle of the individual one of the pool of potential service providers at the time the request is received;
  sending a request for data to the selected at least one potential service provider with a messaging broker, and requesting permission to access and collect data from at least one vehicle sensor located within a vehicle belonging to the at least one acceptable service provider;
  negotiating a contract between the resource sharing marketplace platform and the selected at least one potential service provider;
  collecting data from the selected at least one acceptable service provider, verifying quality of data collected from the selected at least one acceptable service provider, establishing data delivery procedures, and providing a response to the user with a service execution system; and distributing negotiated rewards to the selected at least one acceptable service provider with a reward distribution system.

\* \* \* \* \*